United States Patent [19]

Graf, Jr. et al.

[11] 4,388,273
[45] Jun. 14, 1983

[54] APPARATUS FOR PREVENTING THE DIVERSION OF PLUTONIUM IN NUCLEAR FUEL REPROCESSING

[75] Inventors: Walter A. Graf, Jr., Saratoga; Robert C. Breisch, Santa Clara, both of Calif.

[73] Assignee: Electric Power Research Institute, Palo Alto, Calif.

[21] Appl. No.: 89,524

[22] Filed: Oct. 30, 1979

[51] Int. Cl.³ ................................................ G05B 9/05
[52] U.S. Cl. ...................................... 422/117; 138/40; 376/283; 376/293; 376/316; 422/310
[58] Field of Search ...................................... 176/37-39; 423/8-10; 138/40; 422/261, 310, 117; 220/855; 376/283, 293, 316

[56] References Cited

U.S. PATENT DOCUMENTS

| | | | |
|---|---|---|---|
| 3,357,802 | 12/1967 | Anderson | 423/10 X |
| 3,714,324 | 1/1973 | Weech | 423/10 |
| 4,022,655 | 5/1977 | Gaouditz et al. | 176/38 |
| 4,081,323 | 3/1978 | Gans, Jr. et al. | 176/38 |
| 4,082,608 | 4/1978 | Curet | 176/38 X |
| 4,087,301 | 5/1978 | Steadman | 138/40 X |
| 4,213,824 | 7/1980 | Jabsen | 376/283 |
| 4,278,559 | 7/1981 | Levenson et al. | 423/10 X |

OTHER PUBLICATIONS

*EPRI Journal;* "Civex: A Diversion-Proof Plutonium Fuel Cycle;" pp. 11-13; Apr. 1978.

*Primary Examiner*—Richard L. Chiesa
*Attorney, Agent, or Firm*—Flehr, Hohbach, Test, Albritton & Herbert

[57] ABSTRACT

Apparatus for preventing the diversion of plutonium in nuclear fuel reprocessing plants. The apparatus includes various piping arrangements which prevent plutonium in a liquid state from being drawn out of a nuclear fuel reprocessing cell through conduits which are normally accessible to the operators of the facility.

5 Claims, 5 Drawing Figures

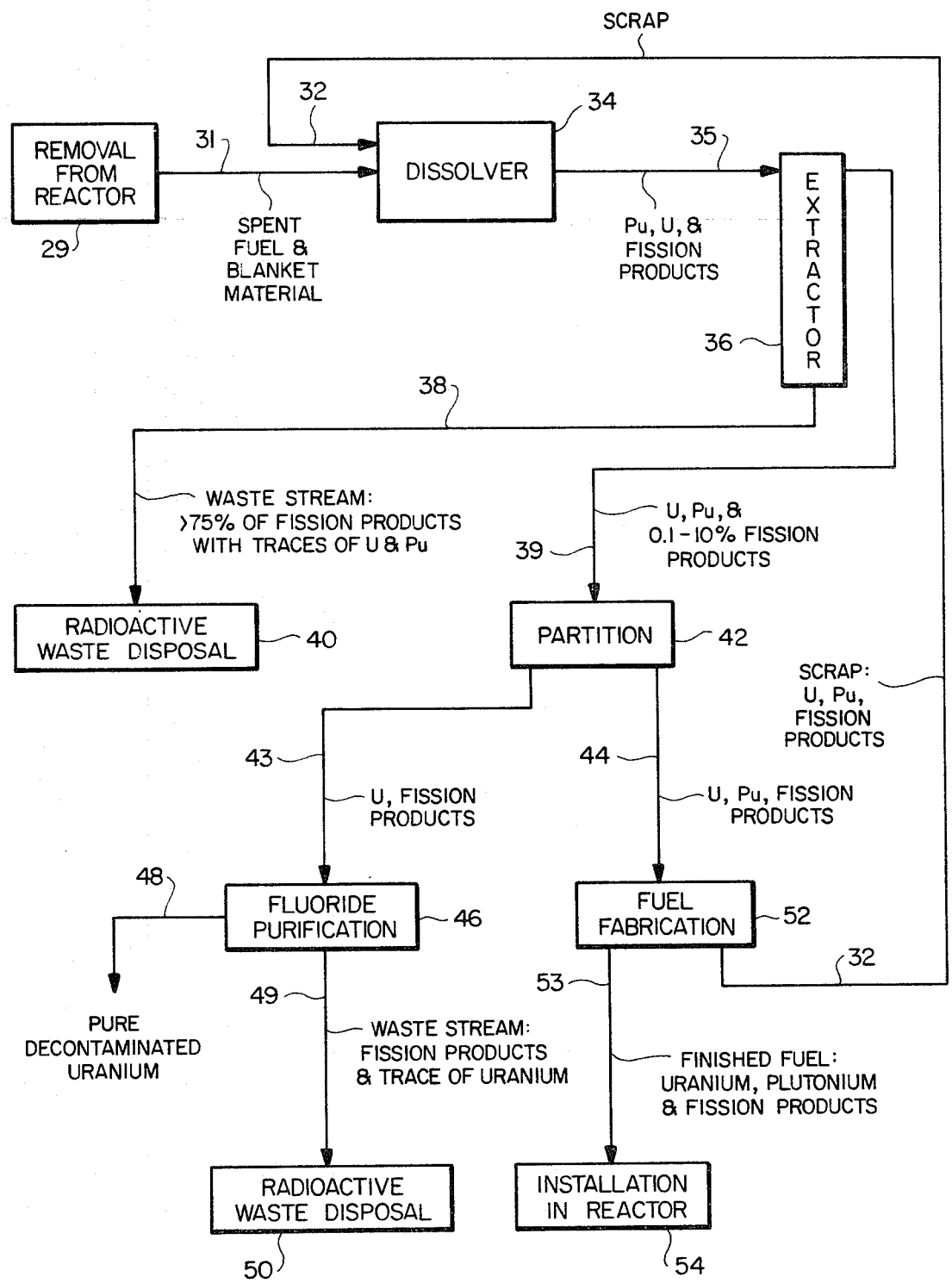
FIG_1

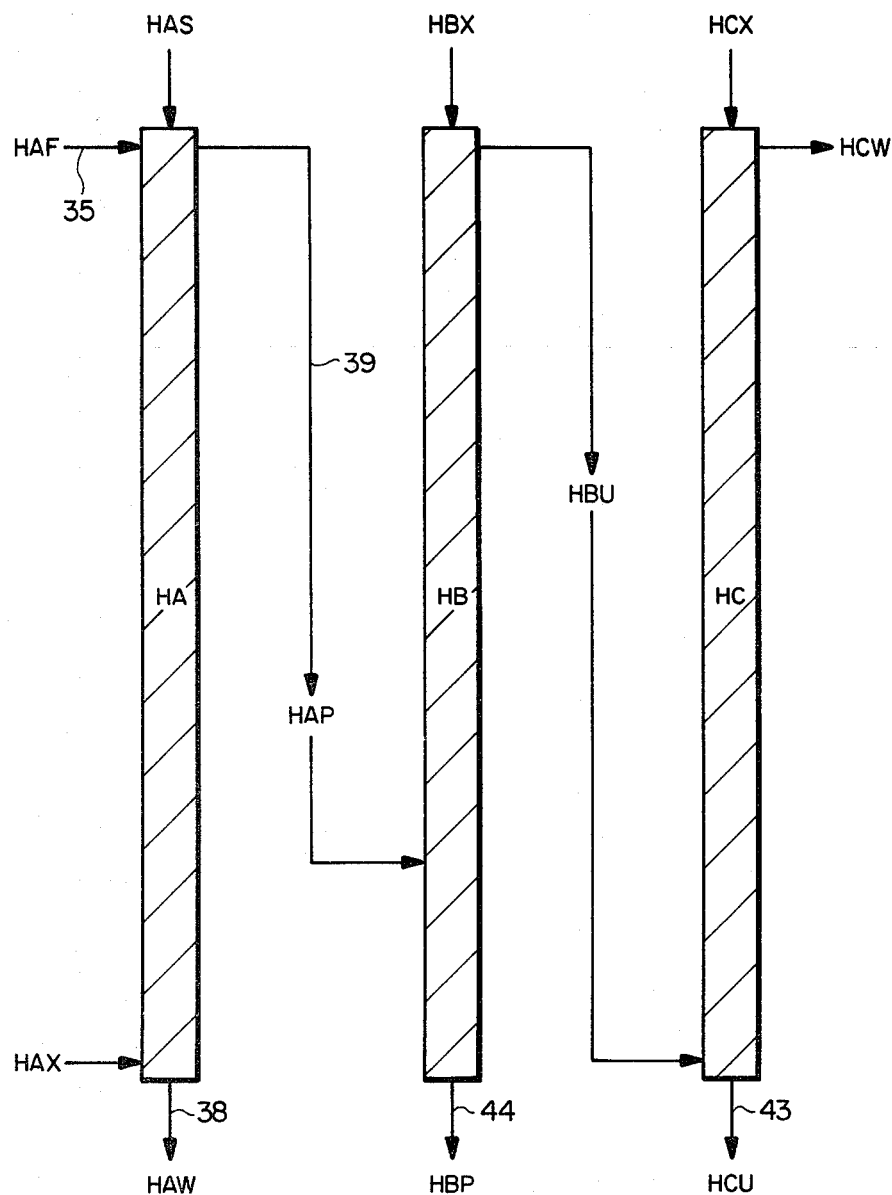
FIG_2
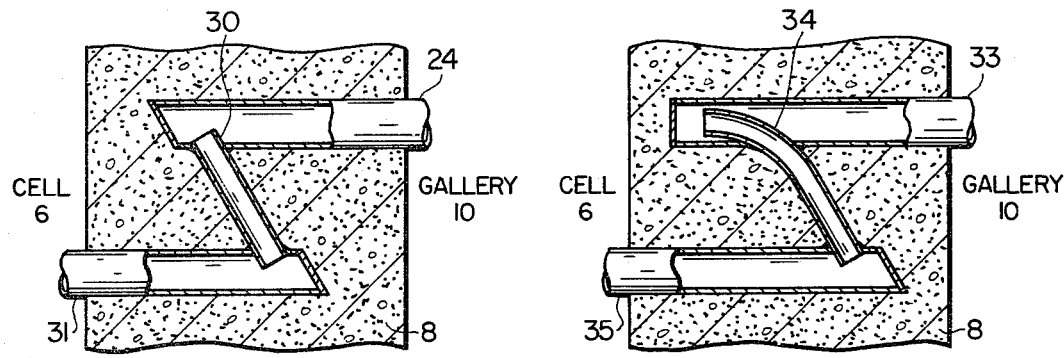
FIG_4 FIG_5

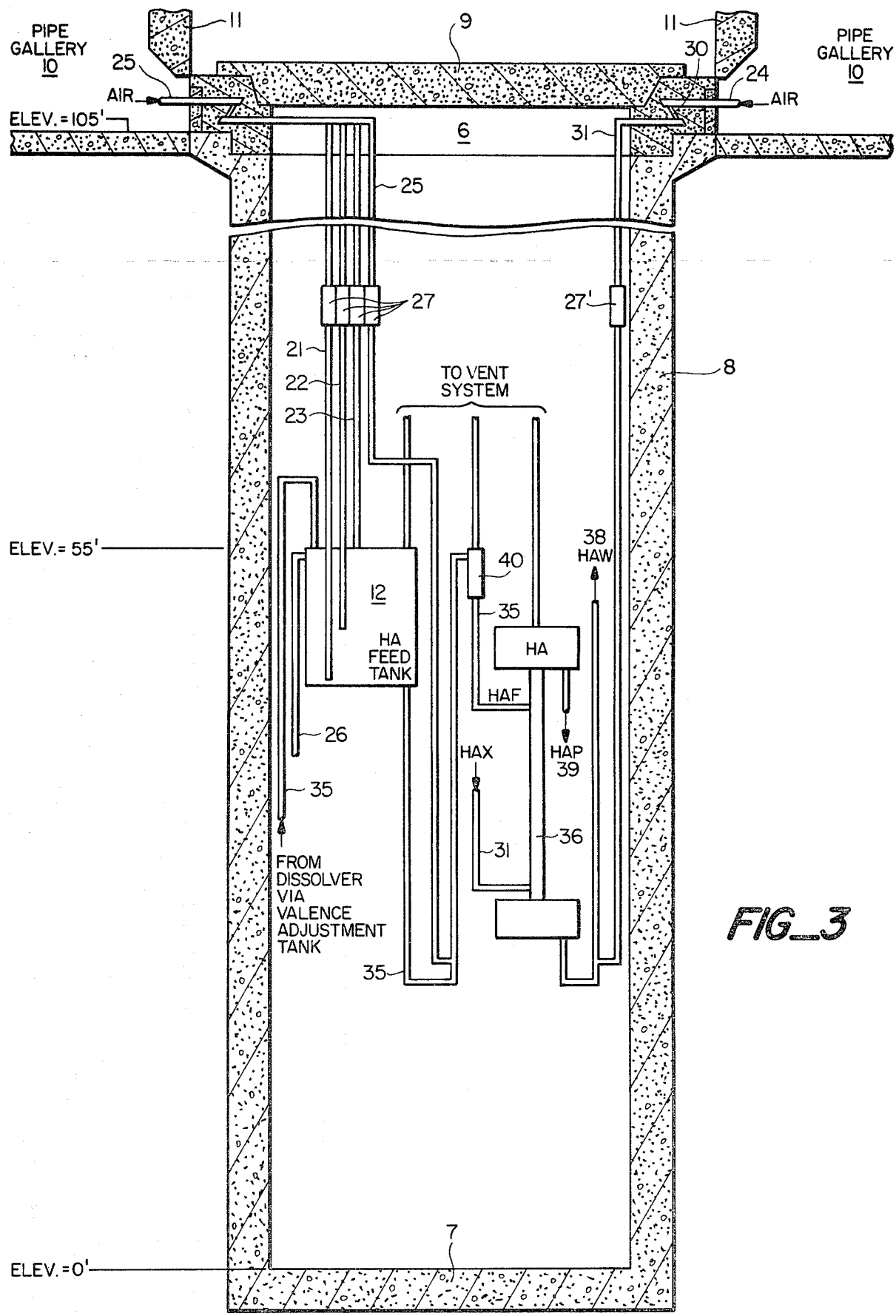

4,388,273

APPARATUS FOR PREVENTING THE DIVERSION OF PLUTONIUM IN NUCLEAR FUEL REPROCESSING

DESCRIPTION

1. Technical Field

This invention generally relates to nuclear reactor fuel reprocessing and, more particularly, to techniques for preventing the unauthorized diversion of plutonium.

2. Background Art

There is serious concern throughout the world that with the increasing deployment of reprocessing facilities that there is an increased likelihood of the further proliferation of nuclear weapons. This concern is due to the fact that essentially all reprocessing methods used heretofore are derived from the processes originally developed during or shortly after World War II for producing plutonium for nuclear weapons. These processes are undesirable because they have the potential to make purified fissionable materials available and therefore susceptible to diversion by terrorist groups. In addition, there is international concern because such reprocessing plants could readily be converted over to the extraction of weapons material by a change of intention by a government which had previously pledged by treaty to forego the production of nuclear weapons.

In answer to this threat Milton Levenson and Edwin Zebroski conceived of a process for reprocessing spent nuclear reactor fuel which makes plutonium highly resistant to diversion. Their concept, which is called The CIVEX Process, includes a combination of changes in the method of reprocessing spent fuel and changes in the design of a reprocessing plant. In general, under this process plutonium in a weapons-usable form is never produced at any point in the plant, all mixtures containing plutonium are always kept sufficiently radioactive to pose a personnel hazard, any attempted diversion is easy to detect and the process is set up so that no readily available change can be made to yield weapons usable material. The design of the plant is such that even if it were occupied by hostile forces, the length of time, the skills and resources required, and the complexity of converting the plant over to produce separated plutonium are comparable to the efforts required to assemble a new reprocessing plant from scratch. Further, any attempts to modify the process involve overt changes in the equipment and flow patterns so that timely warning is available that the diversion of plutonium is being attempted. The CIVEX concept is disclosed in U.S. Pat. No. 4,278,559 entitled METHOD AND APPARATUS FOR PROCESSING SPENT NUCLEAR REACTOR FUEL which was issued on July 14, 1981.

The CIVEX approach employs a processing scheme shown diagrammatically in FIGS. 1 and 2. Within the dissolver system, the spent fuel assemblies are dismembered and concentrated into a liquid solution. The dissolver feed is prepared using either a chop and leach process or oxidation reduction cycles or other known dissolving techniques. Nitric acid is used for the dissolving medium and the output stream 35 contains plutonium, uranium and radioactive fission products in an aqueous solution. This stream is thereafter clarified by settling or filtration or by centrifugation to remove any undissolved solids.

The output stream 35 from the dissolver system 34 is passed to an extractor 36. An extractor is a device for bringing two phases together in a liquid to liquid solvent extraction process. In the preferred embodiment a mixer settler, a pulsed column, a packed column or a centrifigal contactor can be used. The extractor has an output product stream 39 which contains substantially all of the uranium, plutonium, and a substantial amount of the radioactive fission products from the original input stream 35. This product stream is an organic solution and in the preferred embodiment contains between 0.1 and 10% by weight of the fission products originally present in the input stream 35 to the extractor. The extractor has a waste stream 38 which contains the remainder of the fission products originally present in the dissolver output stream 35. The waste stream also contains negligble traces of both uranium and plutonium, typically less than 0.1% of the amounts in stream 35. The waste stream is transferred to a conventional radioactive waste disposal system 40.

The product stream 39, FIG. 1 from the extractor 36 next undergoes the step of partitioning 42. A extractant stream feed contains a reducing agent which converts the plutonium to the +3 state which is essentially insoluble in the organic solvent. The partition contactor has one aqueous output stream 44 wherein the plutonium is concentrated relative to product stream 39, and which contains an excess of uranium as a diluent. In other words, the quantity of uranium is equal to or greater than the quantity of plutonium. The ratio of plutonium and uranium is controlled to produce a "master mix" convenient for fuel fabrication, typically containing 20-25% plutonium and 80-75% uranium. This stream also contains a substantial amount of radioactive fission products. The remaining uranium and fission products leave the partition contactor in the organic solvent with the uranium product stream 43.

The partition operation 42 does not remove radioactive fission products. All of the radioactivity in stream 39 is distributed between streams 43 and 44, but most of the radioactivity goes with the plutonium stream 44 in every case. Normally all of the plutonium mixed with uranium is discharged in the fuel fabrication feed stream 44 and is sufficiently contaminated with radioactive fission products for easy detection of small amounts. For very long-cooled fuel it may be desirable in some cases to supplement the residual radioactivity at this point by addition of suitable long-lived fission product isotopes (such as Ruthenium-106, Zirconium-95 or Cesium-137), or activation products such as Cobalt-60. If the plutonium output is inadvertently or intentionally shifted from the aqueous stream 44 to the uranium product stream 43, the plutonium along with the uranium is stripped to an aqueous solution that is diluted with a large excess of uranium and sufficient fission products to prevent undetected diversion of the plutonium.

The uranium product stream 43, FIG. 1 consists of uranium nitrate dissolved in dilute nitric acid and contaminated with radioactive fission products. After stripping, this stream undergoes a fluoride treatment of the uranium.

The fuel fabrication feed stream 44, FIG. 1, is a dilute nitric acid solution containing a mixture of uranium, plutonium and fission products. This stream undergoes the process 52 of fuel fabrication wherein the stream is first diluted with uranium from the uranium product stream 48. This dilution with uranium adjusts the final uranium and plutonium ratio in the fuel as required by the nuclear design of a given reactor. After dilution the stream is subjected to the sol-gel process in which the uranium, plutonium and fission product mixture is converted to small particles of mixed oxides.

DISCLOSURE OF INVENTION

The CIVEX process discussed above is designed to retain sufficient radioactive gamma material in all process streams containing plutonium so that any diversion involves both personnel hazards and the possibility of detection by radioactive sensors. This approach alone may not be sufficient so an object of the present invention is to prevent personnel contact with any fluids containing plutonium in the liquid handling process systems of the reprocessing facility. Plutonium in solution in these process streams is considered to be the most easily stolen and the most easily converted into weapons grade material.

A further object of the present invention is to minimize the potential for unauthorized theft or diversion of plutonium from reprocessing plants. The apparatus disclosed herein prevents plutonium in an aqueous solution from being diverted from a reprocessing cell through the accessable conduits leading from the cell.

An additional object of the present invention is to provide nuclear fuel reprocessing equipment that will provide sufficient material safeguarding controls so that the equipment can be exported to an emerging nation desiring nuclear energy independence.

These and other objects and advantages are achieved by an apparatus for preventing the diversion of plutonium in a nuclear fuel reprocessing plant. The apparatus includes a cell for housing nuclear fuel reprocessing equipment and for isolating the equipment from plant personnel, said cell having side, top and bottom walls. The cell houses a containing means for plutonium in a liquid state and at least one conduit having one end connected to the containing means and a second end accessable to personnel outside of the cell. The apparatus includes means for preventing the plutonium solution from being removed from the cell through the conduit.

Additional objects and features of the present invention will appear from the following description in which the preferred embodiments have been set forth in detail in connection with the accompanying drawings.

BRIEF DESCRIPTION OF DRAWINGS

FIGS. 1 and 2 are block diagrams illustrating the CIVEX process for reprocessing spent nuclear reactor fuel;

FIG. 3 is a side elevational view in section and broken away of a nuclear fuel reprocessing cell according to the present invention;

FIG. 4 is a side elevational view in section of the apparatus of FIG. 3 broken away and in section; and FIG. 5 is an alternative embodiment of the apparatus illustrated in FIG. 4.

BEST MODE FOR CARRYING OUT THE INVENTION

Referring to FIG. 3, the apparatus includes a nuclear fuel reprocessing cell that houses the reprocessing equipment. In a complete facility several such cells are used. Each cell shields plant personnel from radiation emitted from the reprocessing streams as well as physically isolates personnel from the reprocessing equipment. The cell is fabricated from concrete and includes a bottom wall 7, side walls 8, and a removable top wall 9. The top wall, which is also called the cell cover, is removable in order to provide access to the equipment during construction and for subsequent maintenance. The facility also includes two pipe galleries 10 located above and on either side of the top wall. During operation of the reprocessing facility, plant personnel have access to the pipe gallery and from there control the operation of the plant. All services and non-contaminated fluids added to the process system enter through piping passing through the side wall 11 of the pipe gallery, usually via a removable plug system and underneath the removable cell cover 9.

Referring to FIG. 3, the reprocessing cell contains, inter alia, an HA feed tank 12 and an extractor 36 shown as a pulse column. The HA feed tank is part of the equipment included in process line 35, FIG. 1. It should be understood that for clarity only a few of the service connections to this equipment are shown.

Because the CIVEX concept requires minimum personnel access to the process equipment and no parallel or secondary routings, it is necessary that all equipment have minimum moving parts and have very high reliability. To meet this requirement, pneumatic instrumentation and the processes of air lift transfer, air circulator-agitation and steam or air jet transfer are employed instead of pumps, valves, and electronic instrumentation.

In FIG. 3 feed solution 35 enters the HA feed tank 12 from the dissolver system by steam jet transfer. The continuous feed stream 35 to the HA extractor 36 is routed from the HA feed tank using an air-lift. Air is supplied from the pipe gallery 10 via a conduit 25 to a submerged section of pipe below the HA feed tank. The air rises in the vertical liquid-filled pipe reducing the specific gravity in the pipe and carrying the feed liquid to an air separator 40 above the HA extractor where the air is separated from the liquid. The air travels out the vent system and the liquid drains by gravity into the extractor 36.

The feed solution 35 enters the extractor where it is contacted by an extractant stream, HAX 31, which is an immiscible liquid of lower specific gravity. The HAX extractant extracts the uranium, plutonium and some fission products from the aqueous HA feed stream leaving only fission products in the bottom departing aqueous stream, HAW 38. This stream is air-lifted from the extractor for further processing. Air is supplied through conduit 31 for this air-lifting. The solvent stream HAP 39 overflows the extractor 36 and flows by gravity on to the partition operation 42, FIG. 1.

The HA feed tank 12 usually receives the feed solution via conduit 35 in batches and discharges it continuously. Therefore, the liquid level in the tank varies widely during an operating cycle. The level of this fluid in the tank is measured using the three pipes 21, 22 and 23. Pipe 21 extends to the bottom tank, pipe 22 extends to a point 10 inches above pipe 21 and pipe 23 terminates at the top of the tank. The level of fluid in the tank is computed by measuring the differential pressure between the pipes 21 and 22 and pipes 21 and 23. The height of the fluid in the tank is given by the following equation:

$$h = \frac{\text{differential pressure between pipes 21 and 23}}{\text{differential pressure between pipes 21 and 22}} \times 10 \text{ (inches)}$$

The HA feed tank 12 contains, inter alia, plutonium nitrate dissolved in a nitric acid liquid phase. To prevent removal of the plutonium from the tank without authorization, this tank is equipped with a plurality of systems.

In particular this tank 12 is connected to a vent system that has sufficient capacity to prevent the tank from being pressurized sufficiently to force the plutonium up one of the conduits connecting the tank to the pipe gallery 10. The vent system consists of a plurality of filters and precipitators which prevent the escape of radioactivity into the atmosphere of the cell. These filters and precipitators are sized so that the tanks will remain essentially at atmospheric pressure under all conditions of pressure and temperature. The apparatus is also constructed so that the venting process cannot be blocked by plant personnel from the pipe gallery.

The HA feed tank 12 also includes an overflow line 26 which discharges either into another vessel or onto the cell floor. The overflow line prevents personnel from overfilling the tank with a heavier liquid that could displace the plutonium liquid up to the pipe gallery for diversion.

The HA feed tank 12 and the pipe gallery 10 are also vertically separated by at least 50 feet. This vertical separation prevents anyone from drawing the plutonium liquid in the tank up into the pipe gallery using a vacuum. A vacuum, of course, can draw fluids up for a distance of approximately 32 feet at sea level and a 50 foot separation is used to provide an ample margin over this figure. The vertical separation applies to all of the conduits accessable from the pipe gallery including the three level measuring pipes 21, 22, and 23 and the air lift pipe 25 which drives the HA feed stream 35. In the embodiment of FIG. 3 the highest plutonium fluid level is in the HA feed tank which is at an elevation of 55 feet. The pipe gallery is situated at an elevation of 105 feet so that diversion by vacuum lifting is prevented.

Removal of the fluid from the HA feed tank through the level detecting pipes 21, 22 and 23 by natural air lifting or slug lifting is prevented by a plurality of air/liquid separators 27.

This type of removal is accomplished by applying a vacuum to the end of one of the conduits in the pipe gallery and alternately raising and lowering the liquid level in the tank to alternately seal and vent the end of the conduit in the tank. A two phase flow of fluid and air can be lifted from the tank using this procedure. The separators are large hollow cavities that are designed to permit the two phase flow to expand and to thereby separate the liquid from the motivating gas. The liquid then flows down the conduit and back into the tank. The separators are typically located at about the maximum suction level which is approximately 32 feet above the level of the associated tank.

It is also contemplated that a small, high head, submersible pump with an attached flexible cable could be passed down to the HA feed tank 12 through one of the conduits from the pipe gallery. The submersible pump would operate within the cell and would discharge plutonium solution up through a flexible hose to the pipe gallery.

To prevent the insertion of such a pump into a conduit and the passage of the pump down into fluid communication with the plutonium bearing liquid in the tank 12, all of the conduits passing through the side walls of the cells have a mechanical constriction. Referring to FIG. 4, the conduit 31 leading from the reprocessing cell 6 connects to a reversed vertical conduit 30 which, in turn, is connected to a third conduit 24 which passes out into the pipe gallery. The two conduits 24, 31 are generally parallel. The vertically disposed reversed bend makes the passage of any unauthorized object through the conduit very difficult, if not impossible.

FIG. 5 illustrates a second embodiment of a conduit construction. The conduit 33 from the cell is connected by a curved vertical conduit 34 which connects to a third conduit 35 leading into the pipe gallery. The curved conduit has a vertical curve which extends so that the free end of the pipe is in a coaxial alignment with the axis of the conduit 33 leading into the cell.

The present invention thus contemplates the use of reverse bends, pipe intersections and annular reversals in the conduits extending between the pipe gallery and the cell. These constrictions along with screens and other barriers prevent the diversion of plutonium by using a small pump passed through one of the conduits from the pipe gallery.

It should be understood that although the preferred embodiments have been disclosed in connection with an HA feed tank, the techniques described herein can be used on any container, conduit, and liquid handling apparatus in a reprocessing plant. In fact, it is contemplated that all of these techniques will be used on every conduit that communicates with plutonium and is accessible to plant personnel.

To make the system exportable with less potential for unauthorized field modifications, the equipment and piping is modularized into as large units as is practical. The modules can be completely shop fabricated, tested and the interfaces checked before shipping to the plant site. Field installation forces need only be provided with interconnection information to complete the field welding. Such welding would also be done only in specific areas and under surveillance. This approach would make it difficult for covert modifications which would enhance the potential for plutonium diversion.

We claim:

1. In a nuclear fuel reprocessing plant using plutonium, the improvement comprising:
   (a) an enclosed cell for housing nuclear fuel reprocessing equipment, said cell having side and bottom walls and a removable top wall, wherein said walls shield personnel from radiation emitted from reprocessing streams and for physically isolating the equipment from plant personnel;
   (b) means within the cell for reprocessing spent nuclear fuel;
   (c) means within the cell for containing plutonium solution in a liquid state; and
   (d) an arrangement of components within said cell including a plurality of conduits, each of which has one end in fluid communication with the plutonium solution in said containing means and a second end accessible to personnel outside of the cell, said arrangement of components being configured to prevent an individual located outside said cell from being able to cause plutonium solution within said container means to pass through said conduits from their ends in fluid communication with the plutonium solution to their second ends, whereby to prevent individuals outside said cell from gaining access to said solution by means of said conduits.

2. Apparatus as in claim 1 wherein the preventing means includes a venting system attached to the containing means and having sufficient capacity to prevent the containing means from being pressurized and forcing the plutonium bearing liquid from the cell through the conduit.

3. Apparatus as in claim 1 wherein the preventing means includes a vertical separation of greater than about thirty-two feet between the containing means and the end of the conduit asccessible to personnel, said separation prevents the plutonium bearing liquid in the containing means from being diverted from the cell by a vacuum applied through the conduit.

4. Apparatus as in claim 1 wherein the preventing means includes a liquid/gas separator attached to the conduit, said separator prevents diversion of plutonium by air-lifting liquids from the cell through the conduit.

5. Apparatus for preventing the diversion of plutonium in a nuclear fuel reprocessing plant, comprising:
(a) an enclosed cell for housing nuclear fuel reprocessing equipment, said cell having integral side and bottom walls and a removable top wall, wherein said walls shield personnel from radiation emitted from reprocessing streams and for physically isolating the equipment from plant personnel;
(b) means within the cell for reprocessing spent nuclear fuel;
(c) means within the cell for containing plutonium solution in a liquid state;
(d) at least one conduit having one end connected to the containing means and a second end accessible to personnel outside of the cell; and
(e) means operatively connected to the containing means for preventing the plutonium solution from being diverted from the cell through the conduit, said preventing means including a constriction in the conduit for blocking any insertion of pumping means into the conduit and any passage of the pumping means into fluid communication with the plutonium solution in the containing means.

* * * * *